United States Patent Office 3,464,946
Patented Sept. 2, 1969

3,464,946
ALKYLATED AMINO RESIN TRANS-ETHERIFIED WITH HYDROXY CARBOXYLIC ACID
Brian York Downing, Kingswinford, England, assignor to British Industrial Plastics Limited, Manchester, England
No Drawing. Filed May 16, 1966, Ser. No. 550,107
Claims priority, application Great Britain, May 20, 1965, 21,388/65
Int. Cl. C08g 27/24; C09d 3/50
U.S. Cl. 260—29.4
17 Claims

ABSTRACT OF THE DISCLOSURE

Alkylated amino resins of the urea formaldehyde or substituted triazine type are transetherified with a hydroxy carboxylic acid selected from the group consisting of dimethylol propionic acid, gallic acid, glycollic acid, lactic acid or an ethylene glycol-maleic acid condensation product. The resins may be used in solvent based or aqueous based coatings.

---

This invention relates to novel resins, to a method for their production, and to the application of such resins.

According to the present invention there is provided a series of novel resins which are alkylated amino resins partially or completely transetherified by reaction with a hydroxycarboxylic acid and alkyl ethers of amino resin precondensates partially or completely transetherified by reaction with a hydroxycarboxylic acid.

Particularly preferred amino resins which may be modified by means of the invention to give valuable resins are the reaction products of formaldehyde with urea, melamine and benzo-guanamine, these being of greatest commercial importance, but the invention envisages the use of other amino resins, such as any of the amino-substituted triazine resins, for instance those listed in U.K. patent specification No. 486,519.

The alkylated amino resins are those in which a sufficient proportion of the methylol groups have been converted into ether groups by reaction with alcohols for the resins to be soluble in organic solvents. The particular alcohol used for this etherification in each case must be more volatile than the hydroxy acid used for the transetherification. Of particular importance are those resins etherified by methyl and butyl alcohols, but those from, for example, ethyl, propyl, isopropyl and amyl alcohols are also useful. Ethers of higher alcohols may be used, but since these are themselves usually made by transetherification this would normally not be economic.

Suitable alkyl ethers of amino resin precondensates are the dimethyl ether of dimethylol urea (or dimethoxymethyl urea); the tetramethyl ether of tetramethylol benzoguanamine (tetrakis methoxymethyl benzoguanamine); the hexamethyl ether of hexamethylol melamine (hexakis methoxymethyl melamine); and the corresponding ethyl, propyl, isopropyl, butyl and higher ethers.

The hydroxycarboxylic acid may contain one or more hydroxyl groups, which may be, but are not necessarily, alcoholic, and which preferably are primary hydroxyl groups. Preferably also the hydroxy acid contains more hydroxyl groups than carboxyl groups. Amongst those found suitable are dimethylol propionic acid, glycollic acid, lactic acid and gallic acid (3,4,5-trihydroxy benzoic acid); the hydroxyl groups in the last named are phenolic.

The products formed by condensing 1 mol of a glycol and 1 mol of a dicarboxylic acid or anhydride, e.g. HO·CH$_2$CH$_2$·O·CO·CH=CH·CO·OH, which is obtained from ethylene glycol and maleic anhydride, are also suitable as hydroxycarboxylic acids, as also are products of high acid number obtained by some further condensation of such products. However, it should be noted that the condensation must not be carried too far, otherwise the proportion of both free carboxyl and free hydroxyl groups becomes too low.

The process of the invention for producing the novel resins may be illustrated by the following equation, which shows the transetherification, by means of a hydroxycarboxylic acid, of the etherified amino resin or precondensate:

—OR+HO—X—CO·OH→—O—X—CO·OH+ROH

Thus it will be seen that the free carboxyl groups are transferred to the resin, and are thus available for the production of water-soluble salts with ammonia or organic bases, for instance dimethylamino ethanol and triethylamine.

The transetherification may take place on heating the materials together, without added catalyst, the hydroxy carboxylic acid itself acting as the catalyst. Usually the etherified amino resin or precondensate and the acid are melted together, without solvent, and are heated until the alcohol liberated by transetherification distils off. It is sometimes desirable to facilitate distillation by applying a vacuum, but transetherification does not take place readily until a temperature of at least 60° C. is reached. It is usually desirable to replace only part of the alkoxy groups of the alkyl ether by hydroxycarboxylic acid and it is often preferred to use such a proportion of acid as to provide one hydroxyl group for each mol of alkyl ether.

The novel resins of the invention are not soluble in water, but they do dissolve in water in the presence of an organic base or ammonia by virtue of the formation therewith of salts of which the anion is derived from the resin. Suitable organic bases are those having a boiling point below 140° C., for example dimethylamino ethanol and triethylamine. The solution may also contain a small amount of an organic solvent, such as a lower alcohol or an ether. When the pH of the solution is between 6.5 and 9 the solution is found to be very stable to dilution.

An important application of the novel resins of the invention stems from the fact that they have built-in acidity. Thus they may advantageously be used as crosslinking agents, for instance in conjunction with thermosetting acrylic or epoxy resins in organic solvent solutions, their acidity acting as accelerator. Thus, shorter stoving times or lower temperatures may be used. Mixtures of the resins of the invention, acrylic or epoxy resins, organic solvents and pigments have proved to be good enamels.

When the resins of the invention are to be used as crosslinking agents, for instance in enamels, it is usually preferred to replace only a proportion of the alkyl groups of the alkylated amino resin or precondensate by hydroxy-carboxylic acids so that remaining alkoxy groups are available for crosslinking reaction when the coating is afterwards stoved.

The following examples are given for the purpose of illustrating the invention.

Example 1

1560 gms. (4 moles) of a commercial grade of hexamethoxy-methyl melamine and 268 gms. (2 moles) 1,1-dimethylol propionic acid were charged into a 2 litre reaction vessel fitted with a stirrer, thermometer, still head and condenser. Over a period of 25 minutes the batch was heated to 119° C., at which point methanol began to distil over. The reaction temperature was raised to 128° C. over a further period of 50 minutes and a total of 128 gms. (4 moles) methanol were collected. The resultant resin was then cooled.

The viscosity at 25° C. of a 70% solution of the resin in xylol was 5.2 stokes and the acid value (mgms. of KOH required to neutralise 1 gm. of resin) 40.

200 gms. of the solid resin were dissolved in 45 gms. isobutanol and 150 gms. water were added. Upon adjusting the pH of the mixture to 7.8 by the addition of 10 gms. dimethyl-amino ethanol, a clear homogeneous solution was obtained.

Example 2

1666 gms. 36% formalin were charged in to a 5 litre reaction vessel fitted with an agitator, thermometer and reflux condenser. The pH of the formalin was adjusted to 9.5 by the addition of 3 mls. triethylamine and then 1800 gms. water and 748 gms. benzoguanamine were added. The batch was heated to 70° C. in 60 minutes during which time the benzoguanamine dissolved and a clear solution was obtained. The batch was then maintained at 70° C. for a further 60 minutes. During this time the pH of the solution was kept at 9.0–9.5 by addition of small quantities of triethylamine. After 60 minutes at 70° C. crystals of tetramethylol benzoguanamine began to deposit from solution. The batch was then cooled to room temperature over a period of 6 hours. The product was filtered off and washed with 3 litres water followed by 1 litre methanol. The product was then dried in an oven at 40° C. for 18 hours.

The yield was 1145 gms. of a material containing 3.97 methylol groups per mole of benzoguanamine.

To 450 gms. of the above material were added 1050 gms. ethyl alcohol and 7.5 mls. concentrated hydrochloric acid. The charge was heated to 35° C. and was held at this temperature for 1 hour. During this time the tetramethylol benzoguanamine dissolved and a clear solution was obtained. The batch was then cooled to room temperature and its pH adjusted to 7.0–7.5 using 20% sodium hydroxide solution. The excess ethyl alcohol was removed by vacuum distillation and the resin was finally filtered.

The yield was 561.9 gms. of a product having a molar ratio of combined reactants benzoguanamine:formaldehyde:ethyl alcohol of 1:3.7:3.25.

126 gms. of the etherfied benzoguanamine resin and 23.5 gms. glycollic acid (97%) were heated to 110° C. in 15 minutes. At this point ethanol began to distill over. In the next 15 minutes the reaction temperature was raised to 128° C. during which time 18 mls. ethanol were collected. The resultant resin was then cooled.

The viscosity at 25° C. of a 75% solution of the resin in xylol was 4.3 stokes and the acid value 88.

25 gms. of the solid resin were dissolved in 5 gms. isopropanol and 22.5 gms. water were added. Upon adjusting the pH of the mixture to 7.5 by the addition of 2.5 gms. dimethylaminoethanol, a clear solution was obtained which could be infinitely diluted with water.

Example 3

111 gms. (0.75 mole) of the dimethyl ether of dimethylol urea, prepared in accordance with British patent specification No. 558,683, and 47 gms. (0.25 mole) gallic acid monohydrate were heated to 80° C. in 12 minutes. During the next 15 minutes the reaction temperature was raised to 90° C. and during this time 18 gms. methanol distilled over. The resin was cooled and blended with 2-methoxy-ethanol to give a solution containing 60% solids content.

The viscosity at 25° C. of a 60% solution of the resin in 2-methoxy-ethanol was 11.1 stokes and the acid value 102.5.

To 20 gms. of the resin solution were added 10 gms. water and 1 gm. concentrated ammonia (SG 0.88). A clear homogeneous solution was obtained having a pH of 6.9. This solution could be infinitely diluted with water.

Example 4

740 gms. (10 moles) n-butanol, 366 gms. (10 moles) 82% formaldehyde and 1 ml. N·NaOH were charged into a 2 litre reaction vessel fitted with an agitator, thermometer, azeotropic decanter and condenser. The mixture was heated to 70° C. over a period of 25 minutes and a clear solution was obtained having a pH of 8.5. 240 gms. (4 moles) urea were then added and the temperature was raised to 100° C. over 15 minutes. 100 mls. xylol and a catalyst consisting of 4 gms. phthalic anhydride were then added and the resin solution was distilled; water being removed from the system via the decanter. In 5¼ hours a total of 215 mls. of aqueous distillate were obtained. During this period the reaction temperature rose from 100–123° C. The product was then cooled and filtered. A clear water-white resinous solution was obtained having a solids content of 55% and a white spirit dilution, i.e. number of mls. of solvent tolerated by 5 gms. of resin solution, of 42.2 mls.

186 gms. of the resin solution were distilled at 50° C. under a vacuum of 4 mm. mercury. When 50 gms. of solvent had been removed 40 gms. 1,1-dimethylol propionic acid were added and the batch temperature was raised to 110° C. At this point a vacuum of 4 mm. mercury was applied and the resin was distilled to remove a further 36 gms. of solvent. The product was then cooled and blended with 60 gms. butyl Cellosolve giving a solution containing 70% solids.

The viscosity at 25° C. of a 70% solution of the resin in butyl Cellosolve was 27.5 stokes and the acid value 130.

50 gms. of the above solution were blended with 15 gms. water and the pH of the mixture was adjusted to 7.5 with dimethyl-aminoethanol. A clear solution was obtained which could be diluted with half its own weight of water before haziness occurred.

Example 5

A mixture consisting of 130 gms. BE. 669 (a commercial grade of the hexamethyl ether of hexamethylol melamine) and 34 gms. lactic acid (88%) were heated to 60° C. and a vacuum of 4 mm. mercury was applied. The reaction temperature was then raised to 115° C. over a period of 30 minutes during which time 17 gms. of a mixture of methanol and water distilled over. The resin was finally cooled.

The viscosity at 25° C. of a 75% solution of the resin in n-butanol was 2.1 stokes and the acid value 73.

25 gms. of the solid resin were dissolved in 10 gms. butyl Cellosolve and 10 gms. water were added. Upon adjusting the pH of the mixture to 7.3 by the addition of 3 gms. dimethyl-amino ethanol a clear homogeneous solution was obtained which could be diluted with half its own weight of water.

Example 6

248 gms. (4 moles) ethylene glycol and 392 gms. (4 moles) maleic anhydride were heated to 175° C. in 1 hour, the reaction mixture being purged with nitrogen. The batch was maintained at 175–180° C. for a further 30 minutes during which time 22 mls. water distilled out. The product, an ester, had an acid value of 295 and at this stage was cooled to room temperature.

48 gms. of the above ester and 117 gms. BE. 669 (a commercial grade of the hexamethyl ether of hexamethylol melamine) and 34 gms. lactic acid (88%) were heated to 110° C., at which point methanol began to distil over. In 20 minutes the reaction temperature was raised to 126° C. and a total of 11 mls. methanol were collected. The resin was then cooled to room temperature.

The viscosity at 25° C. of a 75% solution of the resin in xylol was 35.75 stokes and the acid value 66.

35 gms. of the solid resin were dissolved in 15 gms. alcohol and 20 gms. water were added. Upon adjusting the pH of the blend to 7.2 by the addition of 4.5 gms. triethylamine a clear solution was obtained which could be infinitely diluted with water.

For the purposes of the Examples 7 and 8, the *solid* resin of Example 1 is referred to as resin A and the hexamethyl ether of hexamethylol melamine as resin B.

Example 7

A pigment dispersion was prepared by grinding together in a ball mill for 16 hours 300 g. titanium dioxide (Rutiox CR), 30 g. Plex 4686L (a thermosetting acrylic resin, made by Rohm and Haas and sold in the U.K. by Cornelius Chemicals Limited, containing 50% solids) and 90 g. of a 3:1 mixture xylol:butanol; a further 180 g. Plex 4686L was then added and ball milling continued for a short time until the mix was uniform.

Two enamels C and D were then prepared, each containing 48.8% by weight of the above pigment base, 25.7% by weight Plex 4686L, 12.4% by weight 3:1 mixture xylol:butanol, and 13.1% by weight of a 70% solution of a melamine resin in xylol. In enamel C the melamine resin was resin A and in enamel D the resin was resin B; enamel D was catalysed by 0.09 gm. p-toluene sulphonic acid. These enamels each had a total solids content of 55%; a pigment to binder ratio of 0.8:1.0; and a ratio solid acrylic resin:solid amino resin of 7:3.

A wet film, 0.004" thick, of enamel C was applied to a 6" x 4" glass plate using a film applicator and was allowed to air dry for 10 minutes: it was stoved for 45 minutes at 145° C. The hardness by the Koenig pendulum was 130 seconds. A similar film of the catalysed enamel D was treated in similar fashion and had a hardness of 107 sec.

The same two enamels were also compared by applying films of them to 6" x 4" tin plate panels using a paint spinning machine, air drying the films for 10 minutes and stoving them for 30 minutes at 145° C. Both films were 0.002" thick, showed excellent adhesion by the cross hatch test, passed a flexibility test round a ⅛" mandrel, and were equal on a gloss test and the Erichsen indentation test. The mar resistance of enamel C was excellent and that of enamel D fair.

Example 8

A pigment dispersion was made up as in Example 7 except that 300 g. Rutiox CR, 63.6 g. 50% solution of Epikote 1007 (Bisphenol A-epichlorhydrin resin, molecular weight about 2900) and 191.4 g. of a 3:2:1 mixture of xyloyl:Cellosolve acetate:butanol were used for the first stage and a further 45 g. 50% solution of Epikote 1007 were aded.

Two enamels F and H were then prepared from 44.4% g. by weight of this pigment base, 36.5% g. by weight 50% solution of Epikote 1007 and, in the case of enamel F, 8% by weight resin A and 11.1% by weight of the 3:2:1 xylol:Cellosolve acetate:butanol mixture, and in the case of enamel H, 8% by weight resin B, 0.6% by weight of a 10% solution of p-toluene sulphonic acid in xylol, and 10.5% by weight of the above solvent mixture.

Films were applied to glass panels in the same way as described in Example 7 except that stoving was effected at 180° C. The pendulum hardness was 195 seconds on enamel F. and 200 seconds on enamel H. Films were also tested on tin plate as in Example 7 (but stoved at 180° C.). For both enamels the mar resistance and cross hatch adhesion were excellent and Erichsen indentation test 5 mm. The gloss was very good. However, enamel F passed on the ⅛" mandrel test but enamel H failed.

Examples 7 and 8 illustrate that the resin of Example 1 is very effective in conjunction with acrylic and epoxy resins and does not require a catalyst.

What is claimed is:

1. A novel resin which is an alkylated amino resin soluble in organic solvents at least partially transetherified by reaction with a hydroxycarboxylic acid or an alkyl ether of an amino resin precondensate at least partially transetherified by reaction with a hydroxycarboxylic acid, wherein said amino resin is a urea-formaldehyde reaction product or an amino substituted triazine reaction product and wherein the hydroxycarboxylic acid is dimethylol propionic acid, gallic acid, glycollic acid, lactic acid or an ethylene glycol-maleic acid condensation product.

2. A resin according to claim 1 wherein said amino resin is a urea-formaldehyde reaction product, a melamineformaldehyde reaction product, or a benzoguanamineformaldehyde reaction product.

3. A resin according to claim 1 wherein said amino resin precondensate is dimethylol urea, tetramethylol benzoguanamine, or hexamethylol melamine.

4. A resin according to claim 1 wherein said hydroxycarboxylic acid contains more hydroxyl groups than carboxyl groups.

5. A resin according to claim 1 wherein said hydroxycarboxylic acid is dimethylol propionic acid.

6. A resin according to claim 1 wherein said hydroxycarboxylic acid is gallic acid, glycollic acid, or lactic acid.

7. A process for producing a resin containing free carboxyl groups which comprises reacting an alkylated amino resin or an alkyl ether of an amino resin precondensate with a hydroxycarboxylic acid, wherein said amino resin is a urea-formaldehyde or an amino substituted triazine reaction product and wherein the hydroxycarboxylic acid is dimethyl propionic acid, gallic acid, glycollic acid, lactic acid or an ethylene glycolmaleic acid condensation product.

8. A process according to claim 7 wherein sufficient acid is used to provide one hydroxyl group for each mol of alkylated resin or alkyl ether.

9. An ionised aqueous solution in which the cation is derived from an organic base or ammonia and the anion is derived from a resin according to claim 1.

10. A solution according to claim 9 having a pH within the range 6.5 to 9.

11. A solution according to claim 9 wherein said organic base is dimethylamino ethanol or triethylamine.

12. An enamel comprising a resin according to claim 1.

13. An enamel according to claim 12 comprising also titanium dioxide, an acrylic resin, xylol and butanol.

14. An enamel according to claim 12 comprising also titanium dioxide, an epoxy resin, xylol, Cellosolve acetate and butanol.

15. A product according to claim 1 wherein sufficient acid is used to provide one hydroxyl group for each mol of alkylated resin or alkyl ether.

16. A product according to claim 15 wherein the hydroxycarboxylic acid is dimethylol propionic acid.

17. A product according to claim 15 still retaining a portion of the alkyl ether groups.

References Cited

UNITED STATES PATENTS

| 2,524,111 | 10/1950 | La Piana et al. | 260—29.4 |
| 2,680,734 | 6/1954 | Dearing | 260—70 |
| 2,995,541 | 8/1961 | Krupa et al. | 260—70 |
| 3,052,570 | 9/1962 | Polansky et al. | 260—70 |
| 3,056,755 | 10/1962 | Culbertson | 260—67.6 |

MURRAY TILLMAN, Primary Examiner

JOHN T. GOOLKASIAN, Assistant Examiner

U.S. Cl. X.R.

260—33.4, 39, 834, 856, 67.6, 70